United States Patent
Amano et al.

(10) Patent No.: US 6,801,378 B1
(45) Date of Patent: Oct. 5, 2004

(54) DATA RECORDING APPARATUS AND METHOD AND DATA PLAYBACK APPARATUS AND METHOD

(75) Inventors: Mitsuyasu Amano, Tokyo (JP); Masahiko Nagumo, Tokyo (JP)

(73) Assignee: Sony Corporation, Tokyo (JP)

( * ) Notice: Subject to any disclaimer, the term of this patent is extended or adjusted under 35 U.S.C. 154(b) by 359 days.

(21) Appl. No.: 09/604,795

(22) Filed: Jun. 27, 2000

(30) Foreign Application Priority Data

Jun. 29, 1999 (JP) .......................................... 11-183605

(51) Int. Cl.[7] ................................................ G11B 5/09
(52) U.S. Cl. ...................... 360/51; 360/31; 360/74.1; 360/73.07
(58) Field of Search ............................... 360/1–68, 75, 360/74.1, 70; 386/85; 704/400

(56) References Cited

U.S. PATENT DOCUMENTS

| | | | |
|---|---|---|---|
| 5,210,829 A | 5/1993 | Bitner | |
| 5,323,272 A | * 6/1994 | Klingler | .......................... 360/8 |
| 5,363,200 A | * 11/1994 | Frohbach et al. | ........... 386/113 |
| 5,412,780 A | 5/1995 | Rushton | |
| 5,633,764 A | 5/1997 | Ohta | |
| 5,808,823 A | 9/1998 | Kolodin | |
| 5,825,572 A | 10/1998 | Morita | |
| 6,233,391 B1 | * 5/2001 | Morikawa et al. | ............ 386/67 |
| 6,445,877 B1 | * 9/2002 | Okada et al. | .................. 386/95 |

FOREIGN PATENT DOCUMENTS

EP 0 635 826 1/1995

* cited by examiner

Primary Examiner—David Hudspeth
Assistant Examiner—Glenda P. Rodriguez
(74) Attorney, Agent, or Firm—Frommer Lawrence & Haug LLP; William S. Frommer (57) ABSTRACT

To make the most of the storage capacity of a recording medium for data recording and reproduction, data is provisionally stored in a memory at a second data rate DL2, then data is read from the memory at a first data rate, and the recording medium is driven intermittently according to a change in data rate.

12 Claims, 6 Drawing Sheets

DATA RECORDING APPARATUS AND METHOD AND DATA PLAYBACK APPARATUS AND METHOD

BACKGROUND OF THE INVENTION

1. Field of the Invention

The present invention relates to a data recording apparatus and method, and a data playback apparatus and method, for digital data such as video and audio information in a movie or the like.

2. Description of the Related Art

The digital apparatuses for recording and/or playing back digital data to and/or from a recording medium include digital VTRs (video tape recorder).

Supplied with digital data having the MPEG (Moving Picture coding Experts Group) format or digital data having the so-called DV (digital video) format, the digital VTR records it in a recording tape as a recording medium, and also plays back digital data from the tape and provides it to outside. The digital VTR can record and/or play back digital data with higher tone quality and image quality, and edit the data more easily than the ordinary VTR which records and/or plays back analog data to and/or from a recording medium.

For permitting to write digital data supplied from outside to a recording tape, the above-mentioned digital VTR processes the digital data in a predetermined manner such as modulation and the like for recording to the tape at a predetermined data rate. Also, the digital VTR plays back digital data from the recording tape at a predetermined data rate, processes it in a predetermined manner such as demodulation and the like for output to outside.

However, since the digital VTR records and plays back data at a constant tape feed speed, it can only record data for a fixed length of time depending upon the tape feed speed, not upon a data rate of an actual input stream. For example, a video tape with a recording tune of one hour is a one having a recording time depending upon a tape feed speed. Assume here that an input stream of which the data rate is 10 Mbps or 5 Mbps is recorded by a digital VTR designed to record and play back data to and from a recording medium at a data rate of 14.1 Mbps for example. In this case, the amount of digital data which can be recorded to the recording medium is the product of the data rate (14.1 Mbps) of the digital VTR in recording to the recording medium and the length of tape feeding time (one hour or 3,600 seconds in this case), that is, of 14.1 Mbps by 3,600 seconds. However, if the amount of digital data, which can only be recorded to the recording medium is a product of the data rate (10 Mbps or 5 Mbps) of the input stream and the length of tape feeding time (3,600 seconds in this case), namely, a time length of 10 Mbps or 5 Mbps by 3,600 seconds. In this case, the digital VTR has to record dummy data to the greatest part of the recording medium or tape. Thus, the tape cannot effectively be used for data recording.

OBJECT AND SUMMARY OF THE INVENTION

It is therefore an object of the present invention to overcome the above-mentioned drawbacks of the prior art by providing a data recording apparatus and method, and a data playback apparatus and method, which can effectively use the recording capacity of a recording tape by intermittent recording and playback of data to and from the recording tape.

According to the present invention, there is provided a data recorder to record external input data to a recording medium at a first data rate DL1, the apparatus including:

a memory means for storing data supplied at a second data rate DL2;

a data rate changing means for intermittently reading the data stored in the memory means and providing the data as an output; and a controlling means for driving the recording medium intermittently according to the data provided from the data rate changing means;

the data rate changing means reading the data intermittently from the memory means so that the first data rate DL1 is a momentary data rate at which the data rate changing means reads the data read from the memory means and provides it as the output while the second data rate DL2 is a mean data rate at which the data rate changing means reads the data read from the memory means and provides it as the output.

The above data recorder records data intermittently by the memory means for storing the data at the mean data rate, data rate changing means for changing the mean data rate to the momentary data rate, and the controlling means for driving the recording medium intermittently according to the change of the data rate. Thus, for data recording, the data recorder can make the most of the recording capacity of the recording medium.

According to the present invention, there is also provided a method of recording an external input data to a recording medium at a first data rate DL1, the method including steps of:

storing into a memory means data supplied at a second data rate DL2;

reading data intermittently from the memory means and providing it as an output so that the first data rate DL1 is a momentary data rate of the data read from the memory means and provided as the output while the second data rate DL2 is a mean data rate of the data read from the means and provided as the output; and driving the recording medium intermittently according to the output data.

In the above recording method, the data supplied at the second data rate DL2 is stored into the memory means, and then the data is read from the memory means by the data rate changing means at the first data rate DL1, and the recording medium is driven intermittently by the controlling means according to the change of the data rate. Thus, for data recording, the data recording method permits to make the most of the recording capacity of the recording medium.

According to the present invention, there is also provided a data reproducer to read data from a recording medium at a first data rate DL1, the apparatus including:

a controlling means for driving the recording medium intermittently for data reading;

a memory means for storing data read from the recording medium; and a data rate changing means for writing into the memory means the data read from the recording medium and providing it as an output at a second data rate DL2;

the controlling means driving the recording medium intermittently so that the first data rate DL1 is a momentary data rate of the data read from the recording medium and provided to the data rate changing means while the second data rate DL2 is a mean data rate of the data read from the recording medium and provided to the data rate changing means.

The above data reproducer reads data from the recording medium intermittently and changes the data rate by the controlling means for driving the recording medium intermittently, memory means for storing the data at the first data rate DL1, and the data rate changing means for changing the first data rate DL1 to the second data rate DL2. Thus, for data reproduction, the data reproducer can play back data from the recording medium making the most of the recording capacity of the latter.

Therefore, even when the data reproducer is used with any external device which provides data at a data rate different from the reading data rate of the data reproducer, the data rate changing means changes the data rate to an appropriate one to enable the data output to the external device.

According to the present invention, there is also provided a method of playing back data from a recording medium at a first data rate DL1, the method includes steps of:

reading data from the recording medium driven intermittently under the control of a controlling means;

storing the data read from the recording medium into a memory means; and reading the data stored in the memory means and providing it as an output at a second data rate DL2;

the controlling means driving the recording medium intermittently for data playback so that the first data rate DL1 is a momentary data rate of the data read from the recording medium while the second data rate DL2 is a mean data rate of the data read from the recording medium.

In the above recording method, data is read from the recording medium by driving the recording medium intermittently under the control of the controlling means, the data is stored into the memory means at the first data rate DL1, and the first data rate DL1 is changed to the second data rate DL2 by the data rate changer. Thus, for data reproduction, this method permits to read data from the recording medium making the most of the recording capacity of the latter.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 1:
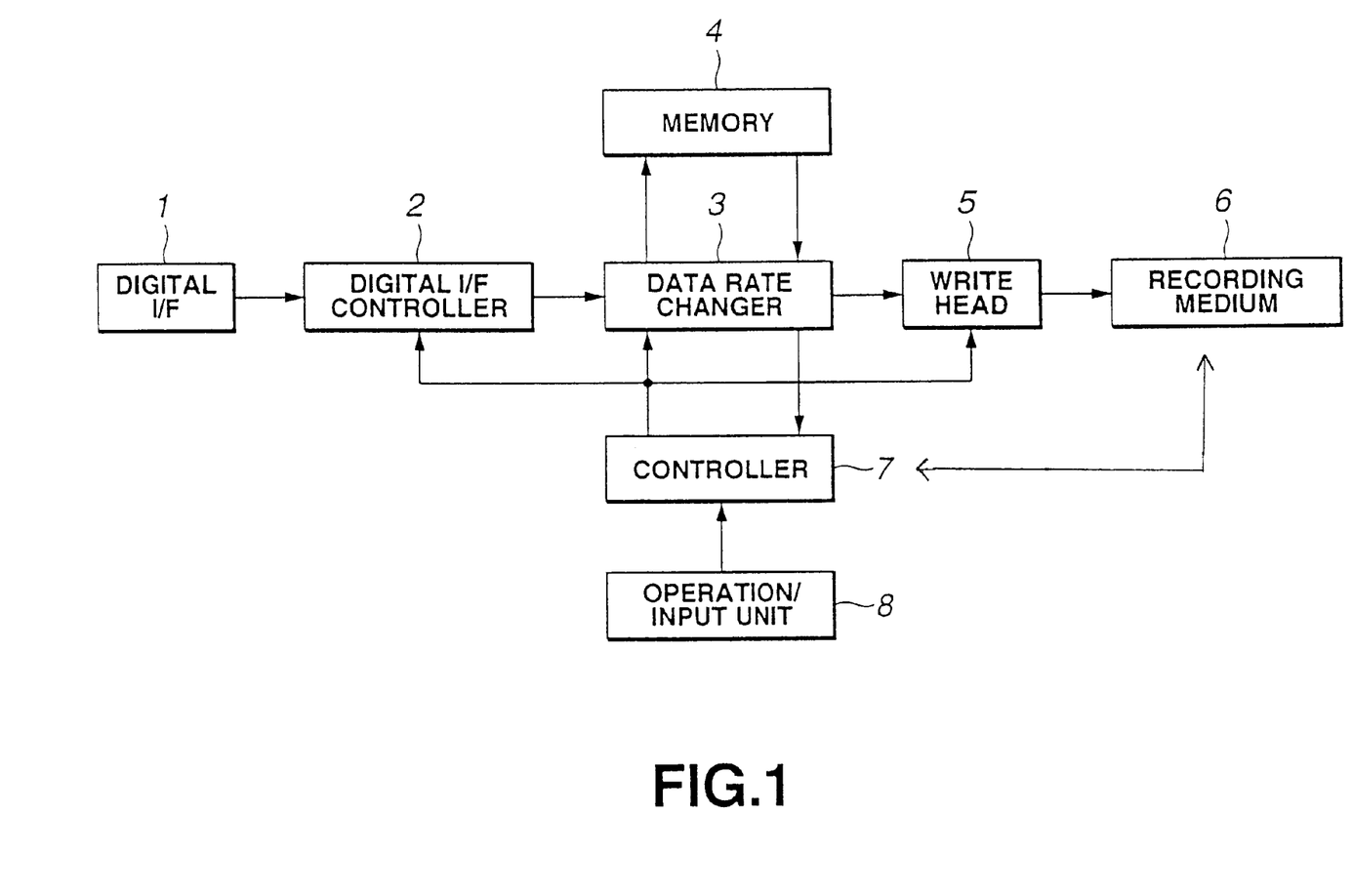
FIG. 1 is a block diagram of the data recorder according to the present invention.

Referring now to FIG. 1, there is schematically illustrated in the form of a block diagram the data recorder according to the present invention. The data recorder is intended to record data supplied from outside. It is assumed herein that data is recorded into the recording medium at a first data rate DL1 which is 14.1 Mbps, for example, and data is supplied from outside to the data recorder at a second data rate DL2 which is 5 Mbps, for example.

As shown in FIG. 1, the data recorder includes a digital interface unit 1 (will be referred to as "digital I/F" hereinafter), digital I/F controller 2, data rate changer 3, data memory 4, write block 5, controller 7, and an operation/input unit 8.

The digital I/F 1 is connected to an external device which provides digital data at the second data rate DL2. The digital I/F 1 is supplied with digital data such as image, sound and the like from the external device at the second data rate DL2.

The digital I/F controller 2 controls the data supply from the digital I/F 1.

The data rate changer 3 writes digital data into the data memory 4 at the second data rate DL2 and reads digital data from the data memory 4 at the first data rate DL1 different from the second data rate DL2 at which the data changer 3 has written the digital data into the data memory 4.

The data memory 4 is a device into and/or from which digital data can be written and/or read at any time, such as DRAM or the like. The data memory 4 provisionally stores the digital data supplied from the data rate changer 3. Also, there are set for the data memory 4 first and second thresholds TH1 and TH2 being the upper and lower limits, respectively, of digital data storage capacity. The first and second thresholds TH1 and TH2 are within the storage capacity of the data memory 4.

The write block 5 makes format change, signal modulation, etc. of the digital data to provide data in an appropriate format for write to a tape-like recording medium 6.

The controller 7 generally controls the operations of the component units of the data recorder.

The operation/input unit 8 has control buttons or is a pointing device (for example, touch panel) to supply external commands to the data recorder.

Figure 2:
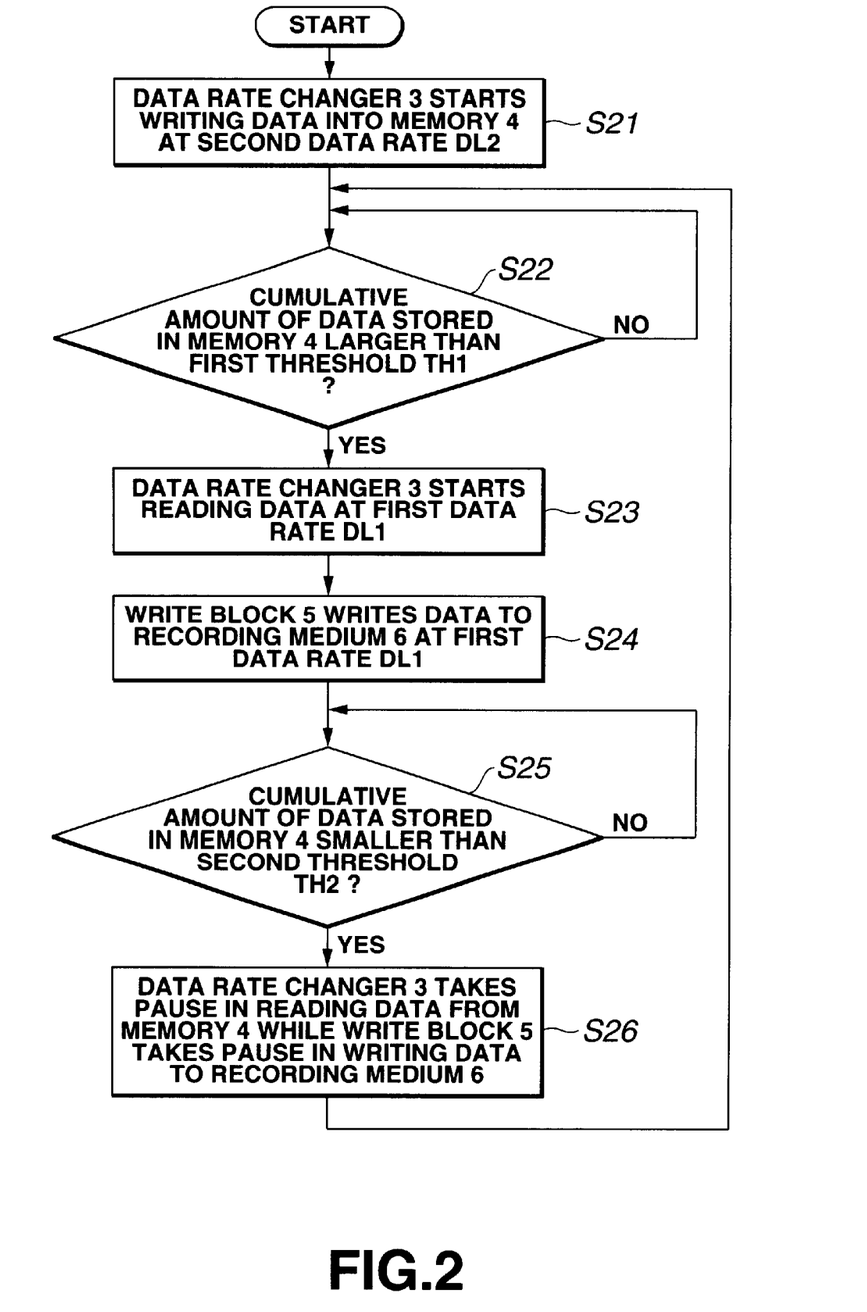
FIG. 2 is a flow chart of operations effected to record data in the data recorder in FIG. 1.

Next, the data recorder constructed as described in the above functions to record data as will be described below with reference to FIG. 2. FIG. 2 is a flow chart of operations effected to record data in the data recorder.

First at step S21, the data rate changer 3 starts writing digital data such as image or sound supplied from the digital I/F 1 into the data memory 4 at the second data rate DL2 which is assumed herein to be 5 Mbps for example. Subsequently at steps S22 to S26, the digital data is continuously written into the data memory 4 at the second data rate DL2.

Next at step S22, the data rate changer 3 judges whether or not the cumulative amount of the digital data having been written in the data memory 4 is larger than the first threshold TH1 of the data memory 4. When the judgment result is YES, the system goes to step S23. If the judgment result is NO, the data rate changer 3 will write the digital data continuously into the data memory 4 at the second data rate DL2 until the threshold TH1 is reached.

At step S23, the data rate changer 3 starts reading digital data from the data memory 4 at the first data rate DL1 which is assumed herein to be 14.1 Mbps for example. Also the data rate changer 3 will provide the controller 7 with a control signal indicating that the cumulative amount of the digital data having been written in the data memory 4 has reached the threshold TH1. Receiving the control signal, the controller 7 will supply the write block 5 with a control signal for write of data to the recording medium 6.

Next at step S24, the write block 5 drives the recording medium 6 in accordance with the control signal supplied from the controller 7 and starts writing digital data to the recording medium 6 at the first data rate DL1. The momentary data rate of the data provided from the data memory 4 to the write block 5 via the data rate changer 3 is 14.1 Mbps, same as the first data rate DL1, while the mean data rate including a pause is 5 Mbps, same as the second data rate DL2.

The operations at steps S23 and S24 are repeated until the system goes to step S26.

On the other hand, at step S25, the data rate changer 3 judges whether or not the cumulative amount of digital data having been written in the data memory 4 is smaller the second threshold TH2. When the judgment result is NO, the data rate changer 3 will read digital data from the data memory 4 at the first data rate DL1 and repeat the digital data write to the recording medium 6 at the first data rate DL1, until the second threshold TH2 is reached. When the judgment result is YES, the system goes to step S26. Since the operation at step S21 is continuously done also while digital data is being read from the data memory 4 at the first data rate DL1, digital data will be written into the data memory 4 at the second data rate DL2.

At step S26, the data rate changer 3 takes a pause in reading of digital data from the data memory 4 and the write block 5 takes a pause in writing digital data to the recording medium 6. When the operation at step S26 is complete, the system returns to step S22.

In the data recorder, digital data is written into the data memory 4 at one data rate and read from the data memory 4 at any other data rate, and the operations at steps S23, S24 and S26 provide intermittent data write to the recording medium 6, as will be seen from the flow chart in FIG. 2.

Note that at step S21 in the flow chart in FIG. 2, digital data is supplied from an external device and when the data supply is complete, all the operations in the flow chart are over.

Figure 3:
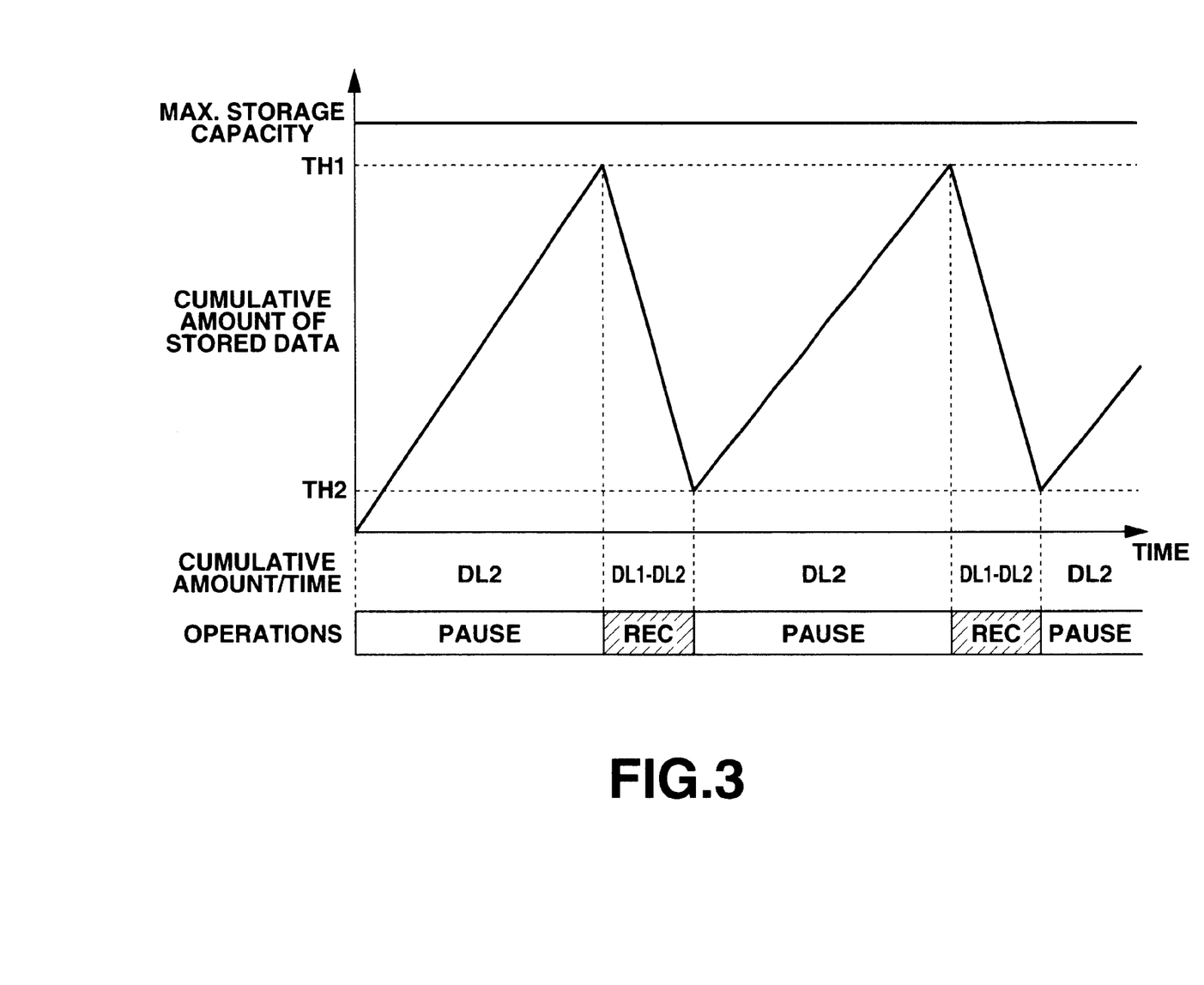
FIG. 3 explains the time change in cumulative amount of the data having been written in the data memory provided in the data recorder in FIG. 1.

FIG. 3 shows the change in cumulative amount of the data having been written in the data memory 4 in the data recorder with the lapse of time t. Note that the first and second thresholds TH1 and TH2 in FIG. 3 are lower than the maximum storage capacity of the data memory 4 and the first threshold TH1 is larger than the second threshold TH2.

As shown, the cumulative amount of digital data having been written in the data memory 4 changes like a saw-tooth waveform with the intermittent operations of the data recorder. In the data recorder, digital data is continuously written into the data memory 4 at the second data rate DI-2. Also in the data recorder, write (REC) of digital data to the recording medium 6 at the first data rate DL 1 and pause (PAUSE) in data write are alternately repeated. Namely, data write is intermittently done to the recording medium 6. Therefore, the first data rate DL 1 will be higher than the second data rate DL2. When data is written to the recording medium 6, the rate of change in cumulative amount of data in the data memory 4 is a difference between the first data rate DL1 (14.1 Mbps for example herein) and second data rate DL2 (5 Mbps for example herein), that is, a difference between 14.1 Mbps and 5 Mbps.

As will be known from the above, when it is assumed that the first data rate DL1 is 14.1 Mbps (data rate for the recording medium in the data recorder) and second data rate DL2 is 5 Mbps (data rate of input stream) and that the recording medium 6 is a one capable of recording data for one hour (namely, its fixed recording length of time depending upon the tape feed speed is one hour), digital data will be written to the recording medium 6 intermittently at a data rate of 14.1 Mbps. Therefore, digital data will be written to the recording medium 6 as a product of the data rate of 14.1 Mbps and a tape running time, one hour in this case, namely, 3,600 seconds (that is, 14.1 Mbps×3,600 seconds). For the data rate of 5 Mbps of input stream, digital data as a product of 5 Mbps and 3,600 seconds will be written to the recording medium 6. Therefore, at the first data rate of 14.1 Mbps digital data can be written to the recording medium 6 in an amount about 3 times larger than at the second data rate of 5 Mbps. Thus, the recording medium 6 can be utilized more effectively.

Note that according to the present invention, the aforementioned first data rate DL1 is not limited to 14.1 Mbps but may be any arbitrary one. Also, the second data rate DL2 is not limited to 5 Mbps but may be any arbitrary one which is lower than the first data rate DL1.

Further to the above note, the second data rate DL2 of the data recorder may not be any always-constant one but may be a one variable with the lapse of time. In this case, with the intermittent operations controlled by the data rate changer 3 in the data recorder correspondingly to the second data rate DL2, digital data can be written to the recording medium 6 at the first data rate DL1.

Figure 4:
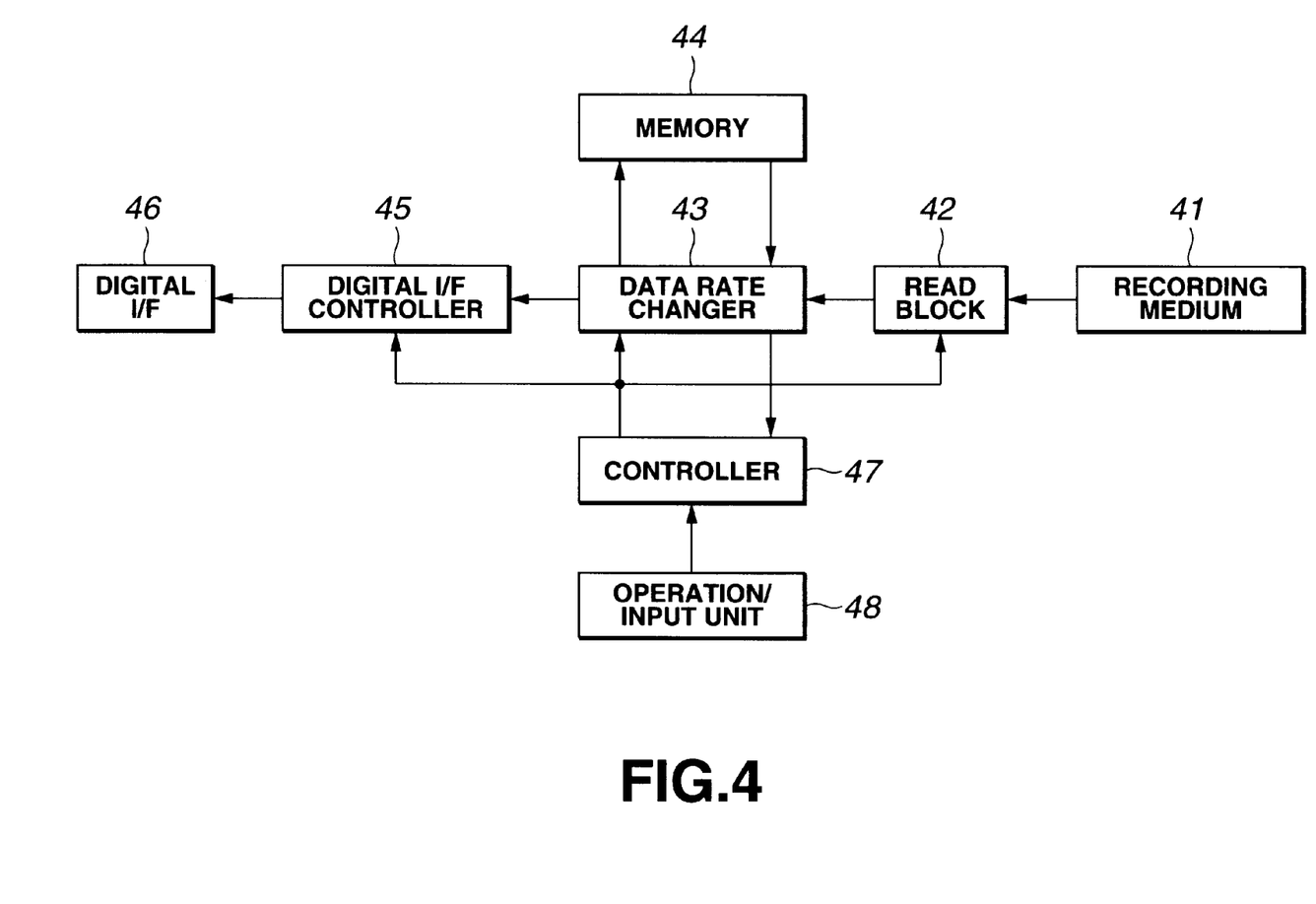
FIG. 4 is a block diagram of the data reproducer according to the present invention.

Referring now to FIG. 4, there is schematically illustrated in the form of a block diagram the data reproducer according to the present invention. The data reproducer is intended to play back digital data from a recording medium and provide it at a data rate suitable for the data supply to an external device. Digital data is read from the recording medium at a first data rate DL1 which is assumed herein to be 14.1 Mbps for example, and the digital data is provided from the data reproducer to outside at a second data rate DL2 which is assumed herein to be 5 Mbps for example.

As shown in FIG. 4, the data reproducer includes a read block 42, data rate changer 43, data memory 44, digital I/F controller 45, digital I/F 46, controller 47 and an operation/input unit 48.

The read block 42 drives a tape-like recording medium 41 intermittently in accordance with a control signal supplied from the controller 47 to read digital data from the recording medium 41. The read block 42 makes format change, signal demodulation, etc. of the read digital data to provide data in an appropriate format for supply to the external device.

The data rate changer 43 writes digital data into the data memory 44 at the first data rate DL1 and reads digital data from the data memory 44 under the control of the controller 47. More particularly, the data rate changer 43 reads the data rate from the data memory 44 at the second data rate DL2 different from the first data rate DL1 at which the data rate controller 43 has written the digital into the data memory 44.

The data memory 44 is a device into and/or from which data can be written and/or read at any time, such as DRAM or the like. The data memory 44 provisionally stores digital data supplied from the data rate changer 43. Also, there are set for the data memory 44 first and second thresholds TH1 and TH2 being the upper and lower limits, respectively, of digital data storage capacity. The first and second thresholds TH1 and TH2 are within the storage capacity of the data memory 44.

The digital I/F controller 45 controls the supply of digital data to the digital I/F 46.

The digital I/F 46 is connected to an external device to which digital data is provided at the second rate DL2. The digital I/F 46 provides digital data such as image, sound and the like to the external device at the second rate DL2.

The controller 47 generally controls the operations of the component units of the data reproducer. To intermittently read digital data from the recording medium 41, the controller 47 supplies a control signal correspondingly to a change of the data rate to drive the recording medium 41.

The operation/input unit 48 has control buttons or is a pointing device (for example, touch panel) to supply commands to the data reproducer from outside.

Figure 5:
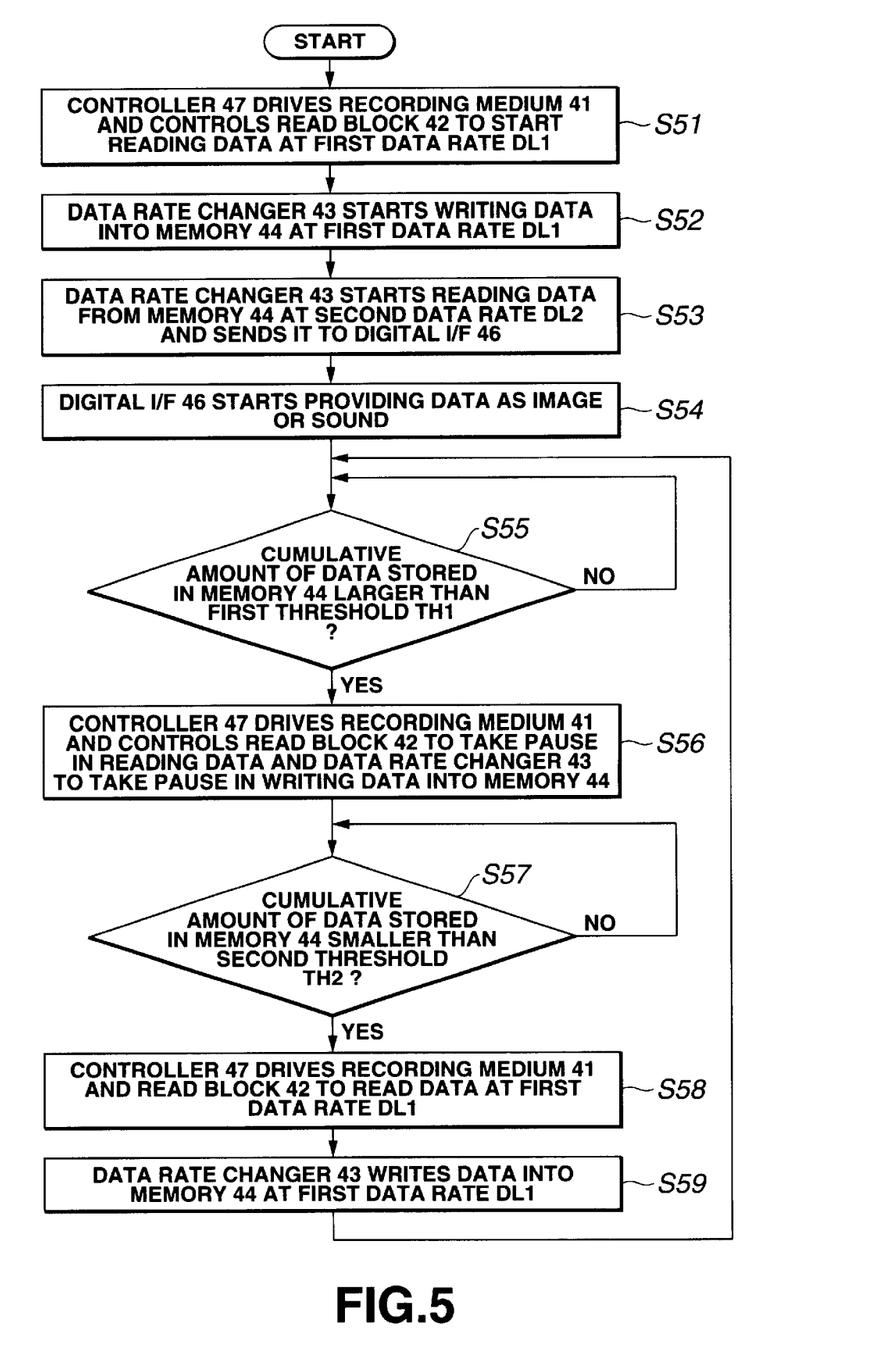
FIG. 5 is a flow chart of operations effected to reproduce data in the data reproducer in FIG. 3.

The data reproducer constructed as in the above functions as will be described below with reference to FIG. 5. FIG. 5 is a flow chart of operations effected to play back data in the data reproducer.

First at step S51, the controller 47 provides the read block 42 with a control signal to drive the recording medium 41, thus allowing the read block 42 to start reading digital data at the first data rate DL1 which is assumed herein to be 14.1 Mbps for example.

Next at step S52, the data rate changer 43 starts writing digital data into the data memory 44 at the first data rate DL1.

Note that the operations at steps S51 and S52 are repeated until the system goes to step S56.

Next at step S53, the data rate changer 43 starts reading digital data from the data memory 44 at the second data rate DL2 which is assumed herein to be 5 Mbps for example, and sends the read digital data to the digital I/F 46.

At step S54, the digital I/F 46 starts supplying the digital data as image or sound. Subsequently at steps S55 to S59, digital data is continuously read from the data memory 44 at the second data rate DL2, and continuously provided as an output from the digital I/F 46.

On the other hand, the data rate changer 43 judges at step S55 whether or not the cumulative amount of the digital data having been written in the data memory 44 is larger than the first threshold TH1 of the data memory 44, and sends a corresponding control signal to the controller 47. When the control signal is supplied to the controller 47 and the judgment result is YES, the system goes to step S56. When the judgment result is NO, the controller 47 will continuously write digital data into the data memory 44 at the first data rate DL1 until the threshold is reached. Also, since the operation at step S53 is continuously done while the digital data is being written into the data memory 44 at the first data rate DL1, digital data is read from the data memory 44 at the second data rate DL2.

Next at step S56, the controller 47 drives the recording medium 41 and has the read block 42 take a pause in reading digital data, and then controls the data rate changer 43 to take a pause in writing digital data into the data memory 44.

Then at step S57, the data rate changer 43 judges whether or not the cumulative amount of the digital data having been written in the data memory 44 is smaller than the second threshold TH2, and sends a corresponding control signal to the controller 47. When the controller 47 receives the control signal and the judgment result is YES, the system goes to step S58. When the judgment result is NO, digital data is continuously read from the data memory 44 at the second data rate DL2 until the threshold is reached.

Next at step S58, the controller 47 supplies a control signal to the read block 42 and drives the recording medium 41. The read block 42 will read digital data from the recording medium 41 at the first data rate DL1 which is assumed herein to be 14.1 Mbps for example.

At step S59, the data rate changer 43 writes digital data into the data memory 44 at the first data rate DL1. After the operation at step S59 is complete, the system goes back to step S55.

As having been described in the above, in the data reproducer, the digital data is written into the data memory 44 at one data rate and read from the data memory 44 at any other data rate, and the operations at steps S51, S52, S56, S58 and S59 provide intermittent data read from the recording medium 41, as will be seen from the flow chart in FIG. 5.

Note that at step S51 in the flow chart in FIG. 5, digital data is supplied by reading it from the recording medium 41. When the data supply is complete, all the operations in the flow chart are over.

Figure 6:
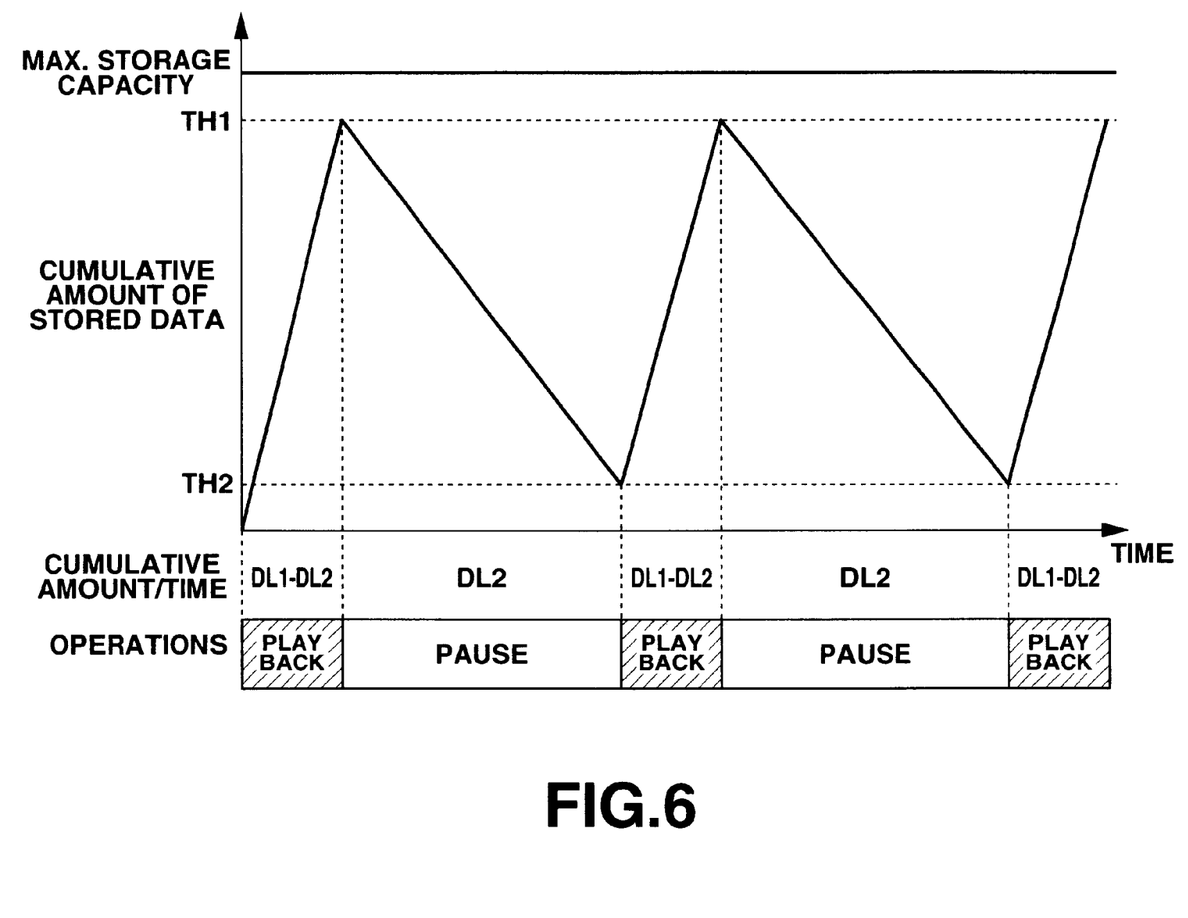
FIG. 6 explains the time change in cumulative amount of the data having been written in the data memory provided in the data reproducer in FIG. 3.

FIG. 6 shows the change in cumulative amount of the data having been written in the data memory 44 in the data reproducer with the lapse of time t. Note that the first and second thresholds TH1 and TH2 in FIG. 6 are smaller than the maximum storage capacity of the data memory 44 and the first threshold TH1 is larger than the second threshold TH2.

As shown, the cumulative amount of the digital data having been written in the data memory 44 changes like a saw-tooth waveform with the intermittent operations of the data reproducer. In the data reproducer, digital data is continuously read from the data memory 44 at the second data rate DL2. Also in the data reproducer, read (PLAYBACK) of the digital data from the recording medium 41 at the first data rate DL1 and pause (PAUSE) in data read are alternately repeated. Namely, data read is intermittently done from the recording medium 41. Therefore, the first data rate DL1 will be larger than the second data rate DL2. When data is read from the recording medium 41, the rate of change in cumulative amount of the data having been written in the data memory 44 is a difference between the first data rate DL1 (14.1 Mbps for example herein) and second data rate DL2 (5 Mbps for example herein), that is, a difference between 14.1 Mbps and 5 Mbps.

As will be known from the above, when it is assumed that the first data rate DL1 is 14.1 Mbps (data rate for the recording medium in the data reproducer) and it is changed by the data rate changer 43 to the second data rate DL2 suitable for data supply to a variety of external devices, namely, to 5 Mbps. Thus, digital data can be provided as output from an external device having the second data rate DL2 different from the data rate for the recording medium in the data reproducer.

Note that according to the present invention, the aforementioned first data rate DL1 is not limited to 14.1 Mbps but may be any arbitrary one. Also note that the second data rate DL2 is not limited to 5 Mbps but may be any arbitrary one which is lower than the first data rate DL1.

Further note that the second data rate DL2 of the data reproducer may not be any always-constant one but may be a one variable with the lapse of time. In this case, with the intermittent operations controlled by the controller 47, the data reproducer can provide digital data at the second data rate DL2 for supply to each external device even if the first data rate DL1 is constant.

The present invention has been described in the foregoing concerning the data recorder and data reproducer, independent of each other. However, the present invention is not limited to these embodiments. That is, the data recorder and data reproducer according to the present invention may be independent of each other, or they may be integrated in a single unit. In the latter case, the write block 5 and read block 42 may be formed as independent blocks, respectively, or they may be integrated in a single block.

The recording media 6 and 41 may be a magnetic recording medium, magneto-optical recording medium or optical recording medium.

What is claimed is:

1. A data recorder that records a continuous input stream received at a second data rate, to a recording medium at a first data rate, comprising:

a memory for storing data at said second data rate while said continuous input stream is input at said second data rate;

a data read/write circuit for intermittently reading at said first data rate the data stored in the memory and providing the read data as an output for recording;

and a controller for driving the recording medium intermittently to record the data at said first data rate as the data read from the memory is provided as said output from the data read/write circuit;

whereby the first data rate is the actual data rate at which the data read/write circuit reads the data from the memory and the second data rate is substantially equal to a mean data rate at which the data read/write circuit reads the data from the memory; and wherein the data read/write circuit starts to read data from said memory when the cumulative amount of data that has been written in the memory becomes greater than a first threshold and the data read/write circuit pauses its reading of said data when the cumulative amount of data that has been written in the memory becomes smaller than a second threshold and said first threshold is greater than a minimum capacity of said memory and said second threshold is lower than a maximum capacity of said memory.

2. The data recorder as in claim 1, wherein the recording medium is a tape.

3. The data recorder as in claim 1, wherein the second data rate is lower than the first data rate.

4. A method of recording a continuous input stream received at a second data rate to a recording medium at a first data rate, comprising the steps of:

storing into a memory data at said second data rate while said continuous input stream is input at said second data rate;

reading data intermittently from the memory at said first data rate and providing the read data as an output for recording so that the first data rate is the actual data rate of the data read from the memory and the second data rate is substantially equal to a mean data rate at which the data is read from the memory; and driving the recording medium intermittently to record the data at said first data rate as the data read from the memory is provided as the output; and wherein data starts to be read from the memory when the cumulative amount of data that has been written in the memory becomes greater than a first threshold, and there is a pause in reading the data from the memory when the cumulative amount of data that has been written in the memory becomes smaller than a second threshold and said first threshold is greater than a minimum capacity of said memory and said second threshold is lower than a maximum capacity of said memory.

5. The method as set forth in claim 4, wherein the recording medium is a tape.

6. The method as set forth in claim 4, wherein the second data rate is lower than the first data rate.

7. A data reproducer that reads data from a recording medium at a first data rate, comprising:

a controller for driving the recording medium intermittently as the data is read from the recording medium at the first data rate;

a memory for storing the data read from the recording medium; and a data read/write circuit for writing into the memory at said first data rate the data read from the recording medium at said first data rate, and reading the data from the memory at a second data rate;

whereby the controller drives the recording medium intermittently so that the first data rate is the actual data rate of the data read from the recording medium and provided to the read/write circuit and the second data rate is substantially equal to a mean data rate at which the data is read from the recording medium;

the controller pauses the recording medium to pause the reading of data from the recording medium when the cumulative amount of data that has been written in the memory becomes larger than a first threshold; and the controller resumes driving the recording medium to start reading data from the recording medium when the cumulative amount of data that has been written in the memory becomes smaller than a second threshold and said first threshold is greater than a minimum capacity of said memory and said second threshold is lower than a maximum capacity of said memory.

8. The data reproducer as in claim 7, wherein the recording medium is a tape.

9. The data reproducer as in claim 7, wherein the second data rate is lower than the first data rate.

10. A method of playing back data from a recording medium at a first data rate, comprising the steps of:

reading data from the recording medium at said first data rate driven intermittently under the control of a controller;

storing the data read from the recording medium in a memory at said first data rate; and reading the data stored in the memory at a second data rate;

whereby the recording medium is driven intermittently for data playback so that the first data rate is the actual data rate of the data read from the recording medium and the second data rate is substantially equal to a mean data rate at which the data is read from the recording medium;

the recording medium is paused so as to pause the reading of data therefrom when the cumulative amount of data stored in the memory becomes larger than a first threshold; and the driving of the recording medium resumes to start reading data therefrom when the cumulative amount data stored in the memory becomes smaller than a second threshold and said first threshold is greater than a minimum capacity of said memory and said second threshold is lower than a maximum capacity of said memory.

11. The method as in claim 10, wherein the recording medium is a tape.

12. The method as in claim 10, wherein the second data rate is lower than the first data rate.

* * * * *